United States Patent
Fahey et al.

(10) Patent No.: US 8,262,825 B2
(45) Date of Patent: Sep. 11, 2012

(54) END-FITTINGS FOR COMPOSITE TUBES, METHOD FOR JOINING FITTINGS TO THE ENDS OF COMPOSITE TUBES AND COMPOSITE TUBES INCORPORATING END-FITTING

(75) Inventors: Mark James Fahey, Mosgiel (NZ); Carsten Mueller, Stuhr (DE)

(73) Assignee: Parker Hannifin GmbH, Bielefeld (DE)

( * ) Notice: Subject to any disclaimer, the term of this patent is extended or adjusted under 35 U.S.C. 154(b) by 171 days.

(21) Appl. No.: 12/677,159

(22) PCT Filed: Sep. 8, 2008

(86) PCT No.: PCT/NZ2008/000232
§ 371 (c)(1), (2), (4) Date: Oct. 19, 2010

(87) PCT Pub. No.: WO2009/035344
PCT Pub. Date: Mar. 19, 2009

(65) Prior Publication Data
US 2011/0186211 A1   Aug. 4, 2011

(30) Foreign Application Priority Data
Sep. 11, 2007   (NZ) ........................................ 561410

(51) Int. Cl.
*B65H 81/00*   (2006.01)
(52) U.S. Cl. ........ 156/172; 156/194; 156/173; 464/181; 464/183
(58) Field of Classification Search ................... 156/250, 156/157, 158, 159, 172, 194, 173; 464/181, 464/183; *B65H 81/00*
See application file for complete search history.

(56) References Cited

U.S. PATENT DOCUMENTS

| | | | |
|---|---|---|---|
| 3,286,737 A | 11/1966 | Kelly, Jr. | |
| 3,537,484 A | 11/1970 | McLarty et al. | |
| 4,469,730 A | 9/1984 | Burhans | |
| 4,519,861 A * | 5/1985 | Christopher | .................. 156/172 |
| 4,530,379 A | 7/1985 | Policelli | |
| 4,532,856 A | 8/1985 | Taylor | |

(Continued)

FOREIGN PATENT DOCUMENTS
DE   19649133   3/1998
(Continued)

OTHER PUBLICATIONS
US 7,185,581, 03/2007, Johnson (withdrawn)

*Primary Examiner* — Khanh P Nguyen
*Assistant Examiner* — Vishal I Patel
(74) *Attorney, Agent, or Firm* — Daniel J. Whitman; Robert J. Clark

(57) ABSTRACT

Composite tubes may be fabricated by filament winding a layer of resin impregnated carbon fiber with a near-axial fiber orientation over a mandrel and over end-fittings. Bands of resin-impregnated fibers are then wound circumferentially around this near-axial layer in a position that coincides with a circumferential groove in the underlying end-fittings. The ends of the near-axial layer are folded back over the bands, resulting in a double layer of intact near-axial fibers locked into the groove on the end-fittings by the bands of intact circumferential fibers. Testing has shown this arrangement to be effective for introducing very high axial loads onto the composite tube.

15 Claims, 3 Drawing Sheets

U.S. PATENT DOCUMENTS

| | | |
|---|---|---|
| 4,548,428 A | 10/1985 | Ruhle |
| 4,549,919 A | 10/1985 | Auberon et al. |
| 4,647,078 A | 3/1987 | Lundy |
| 4,663,819 A | 5/1987 | Traylor |
| 4,685,384 A | 8/1987 | Dirkin et al. |
| 4,697,499 A | 10/1987 | Dirkin et al. |
| 4,717,035 A | 1/1988 | Dirkin et al. |
| 4,755,406 A | 7/1988 | Fuchs |
| 4,802,404 A | 2/1989 | Dirkin et al. |
| 4,810,010 A | 3/1989 | Jones |
| 4,867,044 A | 9/1989 | Holtrop |
| 4,875,717 A | 10/1989 | Policelli |
| 4,930,204 A | 6/1990 | Schurter |
| 4,955,970 A | 9/1990 | Kivi et al. |
| 5,062,914 A | 11/1991 | Fuchs et al. |
| 5,082,314 A | 1/1992 | Aubry et al. |
| 5,160,392 A | 11/1992 | Thongs, Jr. |
| 5,233,737 A | 8/1993 | Policelli |
| 5,303,958 A | 4/1994 | Hyatt et al. |
| 5,318,374 A | 6/1994 | Rumberger |
| 5,415,079 A | 5/1995 | Ching |
| 5,435,868 A | 7/1995 | Yu et al. |
| 5,622,098 A | 4/1997 | Piper |
| 5,651,303 A | 7/1997 | Fish |
| 5,685,933 A * | 11/1997 | Ohta et al. .................. 156/175 |
| 5,720,411 A | 2/1998 | Darby et al. |
| 6,042,152 A | 3/2000 | Baldwin et al. |
| 6,050,612 A | 4/2000 | Wolterman |
| 6,361,080 B1 | 3/2002 | Walsh et al. |
| 7,100,492 B2 | 9/2006 | Fish |
| 7,278,788 B2 | 10/2007 | Fish et al. |
| 2004/0088849 A1 | 5/2004 | Reynolds, Jr. et al. |
| 2006/0016329 A1 | 1/2006 | Johnson |

FOREIGN PATENT DOCUMENTS

| | | |
|---|---|---|
| EP | 0087384 A | 8/1983 |
| EP | 87384 A1 | 8/1983 |
| EP | 464202 | 1/1992 |
| EP | 365391 B1 | 2/1992 |
| EP | 701065 A2 | 3/1996 |
| JP | 59109315 A | 6/1984 |
| JP | 59109315 A | 6/1984 |
| JP | 01307567 | 12/1989 |
| WO | 9111319 | 8/1991 |
| WO | 2006055997 | 6/2006 |
| WO | 2008057405 A1 | 5/2008 |

* cited by examiner

END-FITTINGS FOR COMPOSITE TUBES, METHOD FOR JOINING FITTINGS TO THE ENDS OF COMPOSITE TUBES AND COMPOSITE TUBES INCORPORATING END-FITTING

CROSS REFERENCE TO RELATED APPLICATION

This application claims the benefit of the International Application No. PCT/NZ2008/000232, filed Sep. 8, 2008 which claims priority to New Zealand Patent Application No. NZ561410 filed Sep. 11, 2007, the disclosure of which is expressly incorporated herein by reference.

FIELD OF THE INVENTION

The invention relates to end-fittings for composite tubes and to joining of such end-fittings to composite materials.

BACKGROUND OF THE INVENTION

As used in this specification, the term "composite material" means a combination of a binding matrix material and reinforcing fibre material extending through the matrix. The term includes any fibre-reinforced plastic material. The matrix material can comprise any suitable binding material, including thermosetting resins such as epoxy or polyester resins, or certain thermoplastic materials for example, and the reinforcing fibre material can comprise one or more of, for example, glass fibre, carbon fibre, polyethylene, poly(p-phenylene-2, 6-benzobisoxazole) (PBO) and other synthetic and organic fibres.

Composite tubes may be created by a variety of manufacturing methods, including a technique known as filament winding. In filament winding, the fibre and resin material are wound in a helical fashion about a mandrel and the composite tube results from the coverage of the mandrel by the composite material. The end-fittings may be metal or any other material suitable for the application.

Compared to tubes made of metal such as steel, composite tubes are considerably lighter, have equivalent or higher strength, and generally have better fatigue resistance. Furthermore, the composite tubes do not corrode which is advantageous in caustic environments or undersea applications for example. Another advantage of composite tubes over metal tubes in some applications is that metal tubes burst by fracturing, whereas composite tubes burst by delaminating, in a slow rupturing process.

A disadvantage of composite tubes over conventional metal tubes, however, is that the introduction of load into the ends of composite tubes can be problematic, particularly when the load is high. Ideally the connection to the ends of the composite tube would be at least as strong as the body of the tube.

The problem of connecting end-fittings to the composite tube may be avoided by using external metal tie-rods to secure the end-fittings; hence the composite tube itself does not carry the axial load emanating from the end-fitting. However the use of external tie-rods results in a relatively bulky and heavy assembly, and the tie-rods can stretch when the end-fittings are subjected to high pressures.

One method for securing end-fittings to the composite tube is with adhesives. Adhesive bonding is however relatively weak as it relies on the shear strength of the adhesive to transfer the load between the composite tube and the end-fitting. Adhesively bonded end-fittings in applications of composite hydraulic cylinders, for example, have proven unsatisfactory due to excessive leakage or bursting in high pressure applications.

Another method for securing end-fittings to composite tubes is to engage differing diameters on the two parts. A conventional mechanical thread is one realisation of this method; however threaded connections in the composite material are not suitable for applications involving high loads, because cutting the fibres as well as the matrix considerably reduces the composite material's structural strength.

Alternatively, an annular barb on the end-fitting can be provided to engage with an annular groove on the composite tube. The strength of the connection between end-fitting and composite tube is limited by the shear strength of the barb and the strength of the groove in the composite tube.

In another method, the composite tube may be flared, creating a tapered interface at which the composite tube and end-fitting engage. The axial force at the tapered interface resolves into a force normal to the taper and a shear force parallel to the taper. Additionally friction is generated at the interface, further increasing the shear force. Such designs typically show weakness at the point where the shear force is first introduced into the composite tube and where the fibres are compressed perpendicular to the fibre direction by the force normal to the taper.

In yet another method the composite tube is created by laying fibres axially along the length of tube and over a shoulder on the end-fitting. The axial fibres terminate at the ends of the tube. To prevent the ends of the axial fibres from pulling back over the shoulder when load is applied to the end-fitting, additional fibres are wound circumferentially over the axial fibres in the region of the shoulder. The axial fibres will pull out from between the circumferential fibres and the shoulder if the applied load is high enough, hence the strength of the connection between end-fitting and composite material is limited to the shear strength between the laminates.

In a further method, fibres are again laid axially along the length of the tube, but rather than terminating at the end of the tube, the fibres transition from an axial orientation to a circumferential orientation as they are wound over the shoulder. After a suitable angle of rotation of the fibre about the neck adjacent to the shoulder, the fibre is wound back over the shoulder and along the length of the tube. The process of winding over the shoulder is repeated at the opposite end of the tube. The connection is relatively strong, however winding the fibres over the shoulder can be problematic due to the fibre slipping on the shoulder as it transitions from an axial to circumferential orientation. Slippage can be minimised by following a geodesic path, however defining the geodesic path over an arbitrary geometry shoulder and then laying fibres along this path is difficult, and the resulting fibre orientation does not provide optimal strength. Another difficulty encountered is fibre build-up occurring at the neck.

In a similar method the transition from an axial orientation with respect to the tube, to a circumferential orientation is effected by winding the fibre about pins or tabs on the end-fitting. After a suitable angle of rotation of the fibre about the tube in the circumferential direction, the fibre transitions back to an axial orientation, again using the pin or tab to effect the direction change. The use of the pins or tabs reduces the problem of the fibre slipping at the turn-around region and avoids the need to follow a geodesic winding path. However this variation suffers from fibre build-up in the turn-around region and the strength of the connection is compromised by the abrupt change in fibre direction at the pin or tab.

SUMMARY OF THE INVENTION

It is an object of the present invention to provide a new and improved means for attaching fittings to the ends of composite tubes.

Another object of this invention is to provide an improved means via these end-fittings for introducing axial mechanical loads into the composite tube.

A further object of this invention is to provide a method of attachment of end-fittings that utilizes the strength of the composite material.

A still further object of this invention is to provide a lightweight and functional composite tube which may be readily manufactured.

Each object is to be read disjunctively with the object of at least providing the public with a useful choice.

In a first aspect the invention provides a method of forming a join in a composite tube between an end-fitting and a composite material, including:
forming a layer of composite material having a tubular structure extending over at least part of an end-fitting;
forming a band around the end-fitting and the layer of composite material; and folding the layer of composite material back over the band.

In a second aspect the invention provides a composite tube including: an end-fitting;
a tubular region formed from a composite material extending over at least part of the end-fitting; and
a band positioned around the end-fitting and an inner layer of the composite material;
the composite material being folded back over the band to form an outer layer of composite material.

In a third aspect the invention provides a filament winding apparatus including a mandrel and a pin-ring configured:
to be arranged in fixed relation to each other for formation of a tubular layer of composite material; and
to be movable relative to each other such that, following formation of the tubular layer, the pin-ring can be moved relative to the mandrel to form a fold in the tubular layer, the tubular layer having been fixed in the region of the fold.

BRIEF DESCRIPTION OF THE DRAWINGS

The invention will now be described by way of example only with reference to the accompanying drawings, in which.

DETAILED DESCRIPTION OF PREFERRED EMBODIMENTS

The composite tube may be created by a variety of means, including filament winding or from woven cloth. The embodiment of the present invention described here is based on the availability of filament winding equipment, but it should be understood that the principles of this invention may be fulfilled by alternative fabrication methods (including for example, braiding and wrapping). Advantageously, filament winding allows attachment of an end-fitting to be incorporated into the winding process.

Also, layers or bands of composite material may be formed by any suitable method, including winding fibres impregnated with resin over a mandrel and end-fitting, using a suitable pin-ring arrangement; laying fibres impregnated with resin over a mandrel and end-fitting; or laying dry fibres over a mandrel and end-fitting and subsequently impregnating the fibres with resin.

Figure 1:
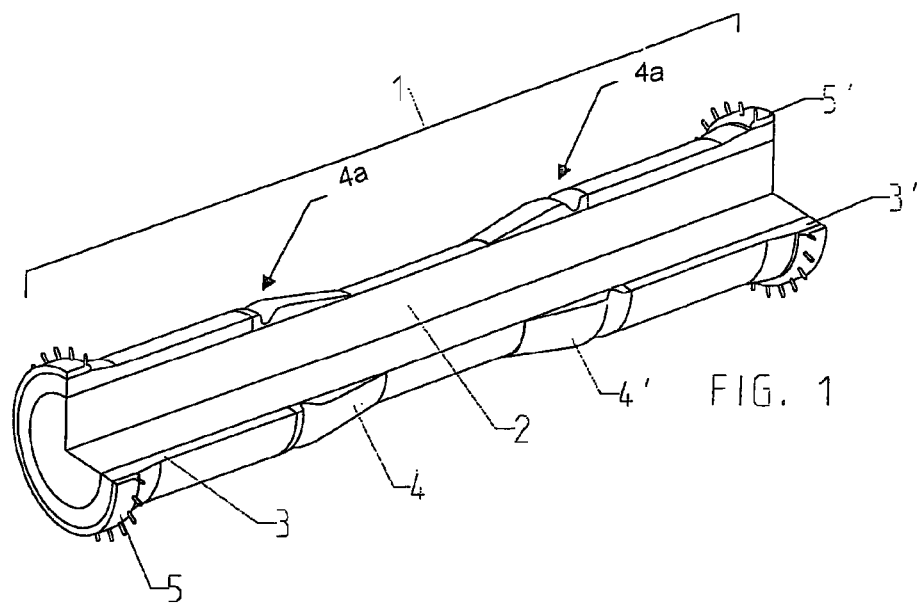
FIG. 1 shows a longitudinal three-quarter sectional view of the assembly prior to winding the composite material.

FIG. 1 depicts a longitudinal three-quarter section view of a mandrel assembly 1 prior to filament winding the composite material. The assembly consists of a mandrel 2 upon which the spacer tubes 3 and 3', end-fittings 4 and 4' and pin-ring 5 and 5' are located. The components in the mandrel assembly 1 could take a cross-sectional form other than cylindrical; elliptical, for example, or any other desired cross-section.

Furthermore, in some applications only one end-fitting 4 may be required, or in the case of T pipe-joints, for example, three end-fittings may be required.

The spacer tubes 3 and 3' serve to increase the diameter about which the composite material is wound, matching the outer diameter of the end-fittings 4 and 4'.

The end-fittings 4 and 4' may be metallic or any other material suitable for the intended application. The end-fittings 4 and 4' are spaced a distance apart on the mandrel 2 that is equal to the desired length of the final composite tube.

The function of the end-fittings 4 and 4' in the final product may be to provide an attachment point at which a mechanical load can be introduced into the composite tube.

The pin-rings 5 and 5' are well known by those skilled in the art of filament winding. They are used to permit the winding of fibres with an axial or near-axial helical fibre orientation about the mandrel, and aid the reversal of the fibre direction during the winding process. The spacer tubes 3 and 3', end-fittings 4 and 4' and pin-rings 5 and 5' are secured axially and tangentially with respect to the mandrel 2, such that these elements are in fixed relation to each other during the winding operation.

Figure 2:
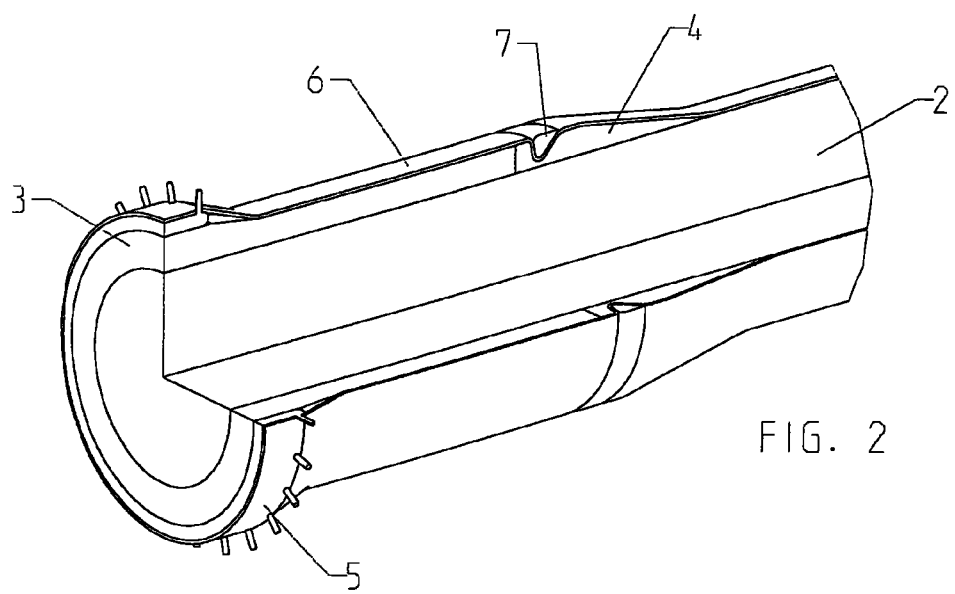
FIG. 2 shows a longitudinal three-quarter sectional view of the composite material after the filament winding operation.

Resin-impregnated fibres are wound around the mandrel assembly 1 using at least a two-axis filament winding machine, delivered by a feed-eye that traverses alongside the rotating mandrel assembly 1 in the mandrel's axial direction. The fibres are laid about the mandrel assembly 1 between the pin rings 5 and 5' with a near-axial fibre orientation with respect to the mandrel's axial direction, or at an angle that optimally suits the loads to be applied to the composite tube. While a pure axial fibre orientation is theoretically possible, in practice a near-axial fibre orientation may be preferred because it allows the fibres to better form to the shape of the mandrel assembly 1 and the strength of the resulting composite structure is less sensitive to variations in fibre tension during the winding process. This layer 6 (FIG. 2) will be referred to hereafter as the near-axial layer. The near-axial fibre orientation contributes to the strength of the tube for carrying an axial load.

The end-fitting 4 includes a peripheral or circumferential surface feature 4a, which in FIGS. 1 to 4 is in the form of a peripheral or circumferential groove. A band of resin-impregnated fibres 7 is wrapped peripherally around the near-axial layer 6 in a position that coincides with the peripheral or circumferential groove 4a in the end-fitting 4. The near-axial layer 6, which initially bridged the groove, is pressed into the groove by the band of peripheral or circumferential fibres 7. Together, the peripheral or circumferential band 7 and the underlying near-axial layer 6 take the form of the groove. A second peripheral or circumferential band of resin impregnated fibres is wound around the second end-fitting 4'.

In general, the peripheral or annular bands 7, 7' may be formed from any suitable material, including metallic rings or metallic split rings. Split rings may provide ease of assembly and could be strengthened using a band of composite material. For convenience and strength, these may be formed from a composite material, preferably from the same or similar composite material as the near-axial layer 6.

Figure 3:
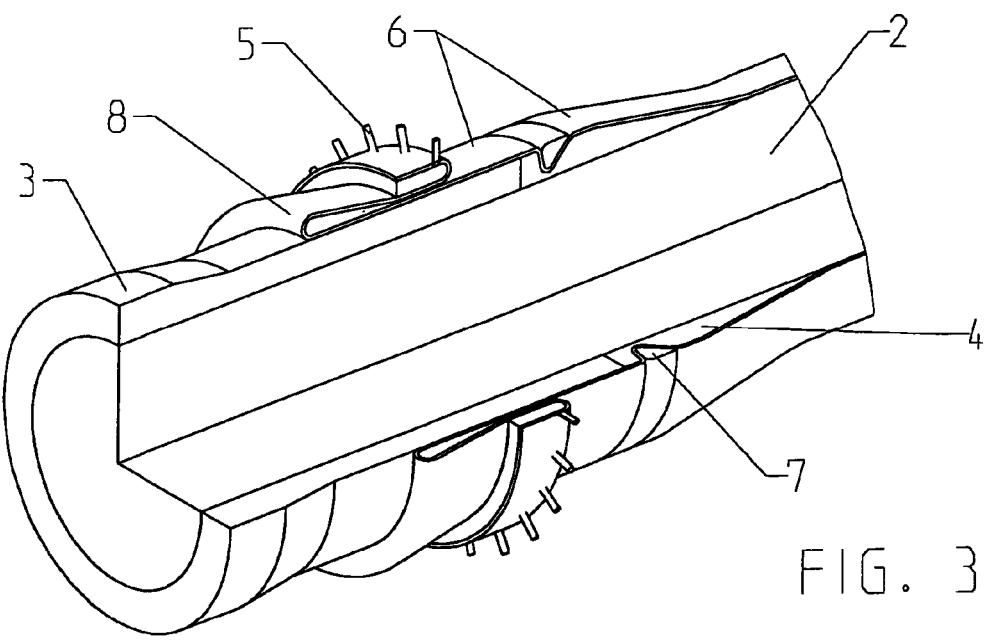
FIG. 3 shows a longitudinal three-quarter sectional view of the near-axial composite layer being folded back over the tube.

The next step of the manufacturing process is depicted in FIG. 3. The pin-ring 5 is unfastened from the mandrel 2 and carried back along the end-fitting and/or the mandrel assembly 1 in such a fashion that the near-axial layer 6 is folded back over itself. The pin-ring 5 and the near-axial layer that follows behind is pulled along the mandrel assembly 1 until the fold-line 8 reaches the band of circumferential fibres 7. The pin-ring 5 is cut free and removed from the mandrel assembly 1. The folding-back procedure is repeated with the pin-ring 5' at the other end of the mandrel assembly 1. By careful selection of the length of the spacer tubes 3 and 3' and position of the pin-rings 5 and 5', the folded back ends 9 and 9' (FIG. 4) may be arranged to meet in the middle of the mandrel assembly 1. For optimal strength, the folded back ends 9 and 9' can be overlapped. However, the folded back layer need simply be of sufficient length to carry the required load. For some applications the folded back layers may be shorter than the length required to meet in the middle of the mandrel assembly.

Thus, the tube includes an inner layer of composite material, a peripheral or annular band and, at least near the annular band 7, an outer layer of composite material formed by folding the inner layer back over the annular band. The inner and outer layers are formed from fibres which are intact in the region of the peripheral or annular band. After curing the composite material as appropriate, the final structure therefore consists of a double layer of intact near-axial fibres locked into the groove on the end-fitting by the band of intact circumferential fibres.

The outer layer is clearly a layer outside the inner layer, but is not necessarily the outermost composite layer in the tube. For example, an additional layer of resin-impregnated fibres may be wrapped circumferentially about the folded-back near-axial layer for the purpose of compressing the underlying layers. Also, as described below, several 'folded back' layers can be used, each having a peripheral or annular band and/or engaging with a peripheral or circumferential surface feature.

The resin matrix material is cured at elevated temperatures, as is well known to those skilled in the art. The composite tube with integrated end-fittings is separated from the mandrel 2 and is then ready for use or alternatively for further operations preparatory to final assembly for use as the case may be.

Figure 4:
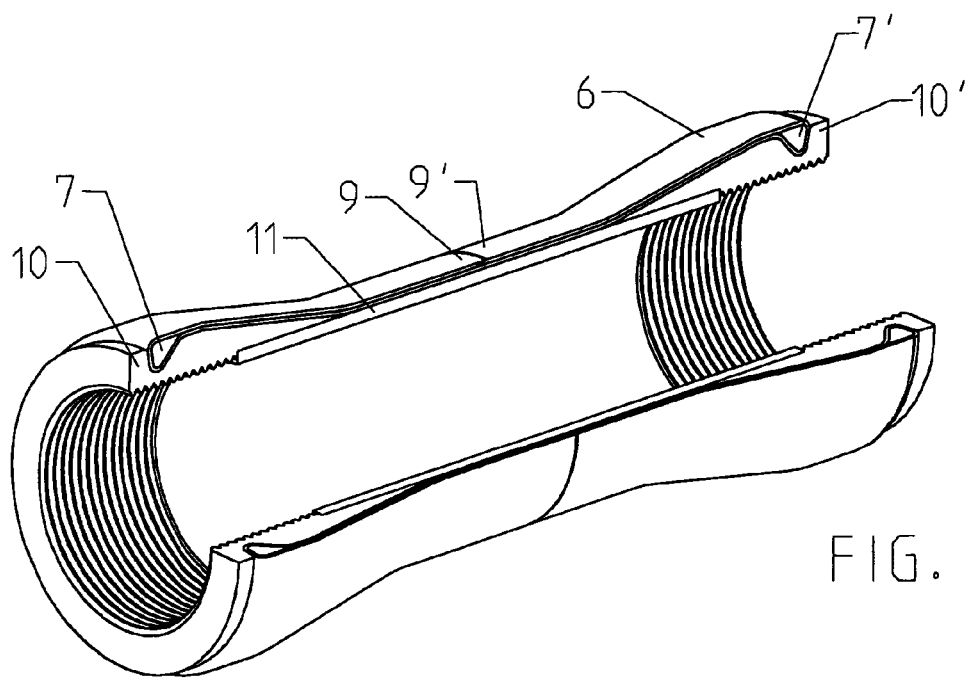
FIG. 4 shows a longitudinal three-quarter sectional view, of one embodiment of the invention.

An example of the resulting composite tube with integrated end-fittings is illustrated in FIG. 4. In this depiction the end-fittings 10 and 10' are shown with an internal mechanical thread, to which a variety of attachments are possible depending on the intended application for the composite tube. Other means of mechanical connection are also possible, including, but not limited to, an external thread and bolted flange. Axial load transfer between the end-fittings 10 and 10' and the near-axial layer 6 is effected by the engagement of differing diameters at the groove on the end-fittings 10 and 10', where the intact near-axial fibres 6 are locked into the groove on the end-fittings 10 and 10' by the bands of intact peripheral or circumferential fibres 7 and 7'. FIG. 4 also shows how an internal liner 11 might be integrated into the composite tube, allowing the composite tube to be used, for example, in hydraulic cylinder applications.

The configuration outlined here has proven to be effective for carrying several axial loads, including very high axial loads, for several reasons. Firstly the near-axial layer 6 and the peripheral or circumferential bands of fibres 7 may each be created from a single continuous filament, and secondly the fibre orientation in the near-axial layer 6 remains optimally configured at all points in the structure. Furthermore, fibres in the near-axial layer are intact in the region of the join, i.e. around the peripheral or circumferential groove 4a. The use of a groove also allows effective performance under both compressive and tensile loads, because of the opposing walls of the groove.

Figure 5:
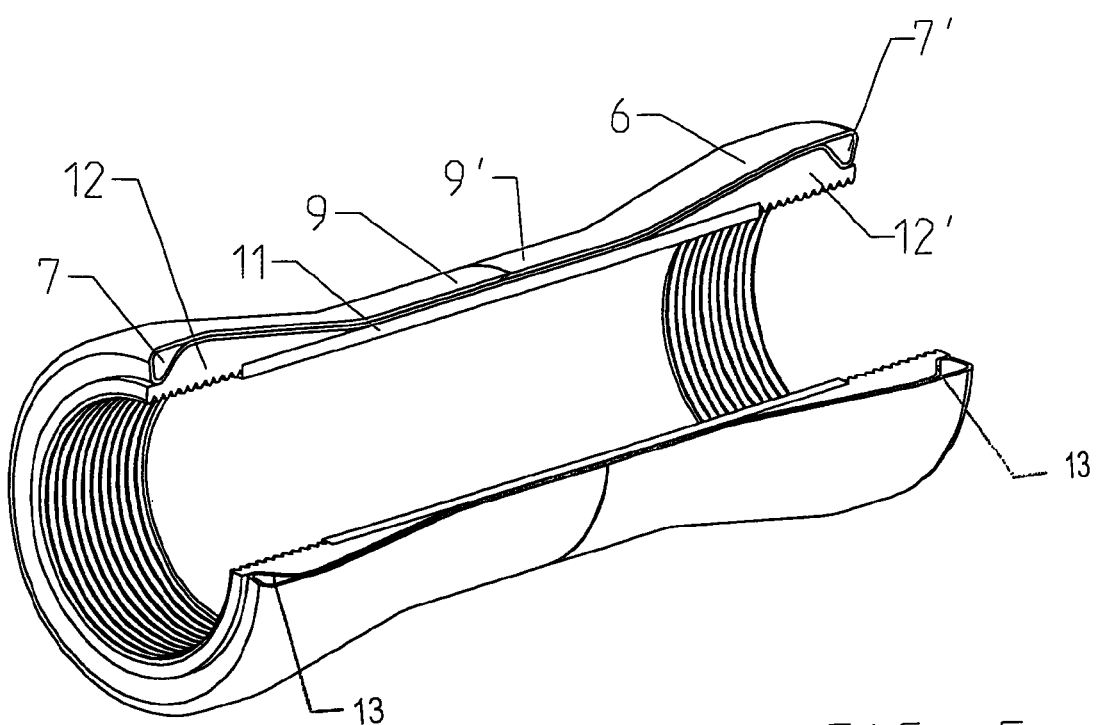
FIG. 5 shows a longitudinal three-quarter sectional view of a further embodiment of the invention.

FIG. 5 shows a further embodiment in which the end fittings 12, 12' are formed with a circumferential surface feature in the form of a shoulder 13, 13'. The annular bands 7, 7' are positioned adjacent the shoulder 13, 13'. Shoulders are not as effective as grooves in transmitting compressive loads to the composite tube. However, they are effective in transmitting tensile loads and therefore may be suitable for some applications.

Folding the near-axial layer of composite material back over the annular band provides a strong join and also removes the ends of fibres in the composite material from the region of the join. This means that there is reduced danger of fibres being pulled through the join under axial loading. The fold also allows a double layer of composite to be applied to the tube in a convenient manner.

Following completion of the tube with one or more end-fittings the composite material is cured as appropriate, as will be understood by a reader skilled in the art. Thus, a rigid composite tube incorporating one or more end-fitting is formed. The circumferential band(s) are encased within cured composite material and form a permanent part of the cured composite tube.

In general the circumferential surface feature may be a groove, shoulder, protrusion, recess or other suitable feature. A groove is preferred because it is easily manufactured, is strong and contributes both to tensile and compressive strength, as discussed above.

Composite tubes may include two end-fittings as described, one at each end of the tube. Alternatively, composite tubes including only a single end-fitting according to the invention are also within the scope of the invention. Such tubes may include any desired feature at the other end of the tube, including joins or end-fittings of other types.

The circumferential surface feature contributes to the strength of the join by assisting in transmission of axial loads from the end-fitting to the composite layer. The annular band acts to press the layer of composite material against the circumferential surface feature, keeps the composite material in position in relation to the surface feature and provides further strength to the join because its circumference matches that of the groove or the narrow section adjacent the shoulder.

In a further embodiment, an end-fitting may be formed with any number (e.g. two or more) peripheral or circumferential surface features. A first layer of composite material is folded back over a first peripheral or annular band and engages with a first surface feature. This first layer is substantially as described above. Further layers of composite material are folded back over further peripheral or annular bands and each engages with a further surface feature. This would increase the maximum axial load that could be carried by the finished composite tube.

In fabrication, the 'folded back' layers would be formed one at a time, each by the method described above.

In general any cross-sectional form of tube may be formed. Different cross-sections may be suitable for different applications. The term "tube" is accordingly intended to encompass tubes of any cross-section, including circular, elliptical, polygonal etc. However, preferably there is no inverted curvature (i.e. concavity) in the cross-section, as this would result in the annular band bridging over the concave region rather than pressing the near-axial layer down into the circumferential groove.

Similarly, the terms "peripheral", "annular" and "circumferential" are not intended to limit the cross-section to a circular or elliptical cross-section but apply also to other cross-sections.

Composite tubes as described above may be used in many applications, including rocket motor casings, fluid conveyance pipes used for example oil exploration and mobile concrete pumps, pressurized fluid containment vessels such as hydraulic and pneumatic cylinders and pressure accumulators, torque transmitting shafts for example in vehicle drivechains, and load transmitting struts for example in an aircraft fuselage.

Also, the term "end-fitting" is intended to mean a fitting for the end of a region of composite material. The term therefore includes not only fittings for the ends of composite tubes but also fittings which are positioned between two regions of composite material, such as joins in composite tubes. Such an end fitting is arranged to join to a first composite tube at one end of its structure and a second composite tube at a second end of its structure, so would consist of a tubular section with a circumferential groove at each end. One example of such a fitting is a trunnion mounting arrangement for a hydraulic cylinder. The mounting arrangement may have an external thread onto which a trunnion can be threaded.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A method of forming a join in a composite tube between an end-fitting and a composite material, including:
   i. forming a layer of composite material having a tubular structure extending over at least part of an end-fitting, fibers of the layer reversing direction on a ring;
   ii. forming a band around the end-fitting and the layer of composite material;
   iii. folding the layer of composite material back over the band by moving the ring relative to the end-fitting; and
   iv. cutting the layer free from the ring.

2. A method as claimed in claim 1 wherein the layer of composite material is an axial or near-axial layer.

3. A method as claimed in claim 1 wherein the band is formed from a composite material.

4. A method as claimed in claim 1 wherein step ii) includes forming the band around a peripheral surface feature so as to press the layer of composite material into or against the surface feature.

5. A method as claimed in claim 4 wherein the peripheral surface feature is a peripheral groove.

6. A method as claimed in claim 4 wherein the peripheral surface feature is a peripheral shoulder.

7. A method as claimed in claim 1 including:
   v. mounting an end-fitting, a mandrel and the ring in fixed relation to each other; and
   vi. carrying out step i) by winding fibers impregnated with resin over the mandrel and end-fitting, and around the pins in the ring.

8. A method as claimed in claim 1, wherein the layer of composite material is formed by laying or winding fibers impregnated with resin over a mandrel and the end-fitting.

9. A method as claimed in claim 1, wherein the layer of composite material is formed by laying fibers over a mandrel and the end-fitting and subsequently impregnating the fibers with resin.

10. A method as claimed in claim 1, including forming a further layer of composite material having a tubular structure extending over at least part of an end-fitting;
   forming a further band around the end-fitting and the further layer of composite material; and
   folding the further layer of composite material back over the further band.

11. A method as claimed in claim 10 wherein the further band is formed around a further peripheral surface feature so as to press the layer of composite material into or against the further surface feature.

12. A method of forming a composite tube, including forming a first join at a first end of a tube between a first end-fitting and a composite material, and forming a second join at a second end of the tube between a second end-fitting and the composite material, each join being formed by the method of claim 1.

13. A method as claimed in claim 12 wherein step iii) is performed in respect of each join such that the ends of the composite layer meet or overlap at a point along the length of the tube.

14. A method as claimed in claim 1 including forming a further layer of composite material over the outside of the tube.

15. A method as claimed in claim 4 wherein the peripheral surface feature is a protrusion.

* * * * *